(12) United States Patent
Kawata

(10) Patent No.: US 9,817,273 B2
(45) Date of Patent: Nov. 14, 2017

(54) LIQUID CRYSTAL DISPLAY DEVICE

(71) Applicant: Japan Display Inc., Minato-ku (JP)

(72) Inventor: Yasushi Kawata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 110 days.

(21) Appl. No.: 14/931,963

(22) Filed: Nov. 4, 2015

(65) Prior Publication Data

US 2016/0154264 A1 Jun. 2, 2016

(30) Foreign Application Priority Data

Nov. 28, 2014 (JP) .................................. 2014-241854

(51) Int. Cl.
G02F 1/1337 (2006.01)

(52) U.S. Cl.
CPC ........ G02F 1/13378 (2013.01); G02F 1/1337 (2013.01); G02F 2001/133773 (2013.01); G02F 2202/40 (2013.01)

(58) Field of Classification Search
CPC ....................... G02F 1/133553; G02F 1/13378
See application file for complete search history.

(56) References Cited

U.S. PATENT DOCUMENTS

| 6,232,947 B1* | 5/2001 | Miyawaki | G02F 1/133553 345/100 |
| 6,867,830 B1* | 3/2005 | Hirota | G02F 1/133553 349/96 |
| 2007/0146599 A1* | 6/2007 | Uchida | G02F 1/133753 349/129 |
| 2008/0074568 A1* | 3/2008 | Tanaka | G09G 3/3406 349/37 |
| 2008/0225209 A1* | 9/2008 | Higa | G02F 1/133555 349/96 |
| 2010/0053511 A1* | 3/2010 | Ohmuro | G02F 1/13363 349/102 |
| 2010/0158347 A1* | 6/2010 | He | G09G 3/006 382/149 |
| 2012/0069425 A1* | 3/2012 | Sato | G09G 3/3446 359/296 |

(Continued)

FOREIGN PATENT DOCUMENTS

| JP | 2009-180879 | 8/2009 |
| JP | 5093779 | 12/2012 |

(Continued)

*Primary Examiner* — Sang V Nguyen
(74) *Attorney, Agent, or Firm* — Oblon, McClelland, Maier & Neustadt, L.L.P.

(57) ABSTRACT

According to one embodiment, a liquid crystal display device includes a liquid crystal layer, a first substrate and a second substrate. The first substrate includes a light reflection type of first pixel electrode and a first alignment film. The second substrate includes a counter-electrode and a second alignment film. A first alignment treatment direction is inclined in a second direction of rotation at an angle of 110° to 130° with respect to in a second alignment treatment direction. A liquid crystal material is used which contains an optically active substance which gives liquid crystal molecules a twisting force from the second alignment film toward the first alignment film in the second direction of rotation.

9 Claims, 6 Drawing Sheets

(56) References Cited

U.S. PATENT DOCUMENTS

| | | | | |
|---|---|---|---|---|
| 2013/0234954 A1* | 9/2013 | Koide | ............... | G06F 3/0488 |
| | | | | 345/173 |
| 2014/0063390 A1* | 3/2014 | Yonekura | .......... | G02F 1/136286 |
| | | | | 349/39 |
| 2014/0098312 A1* | 4/2014 | Kitani | ................ | G02F 1/13306 |
| | | | | 349/41 |
| 2014/0204072 A1* | 7/2014 | Yamaguchi | .......... | G09G 3/3614 |
| | | | | 345/212 |

FOREIGN PATENT DOCUMENTS

| | | |
|---|---|---|
| JP | 5190818 | 4/2013 |
| JP | 2014-021182 | 2/2014 |

\* cited by examiner

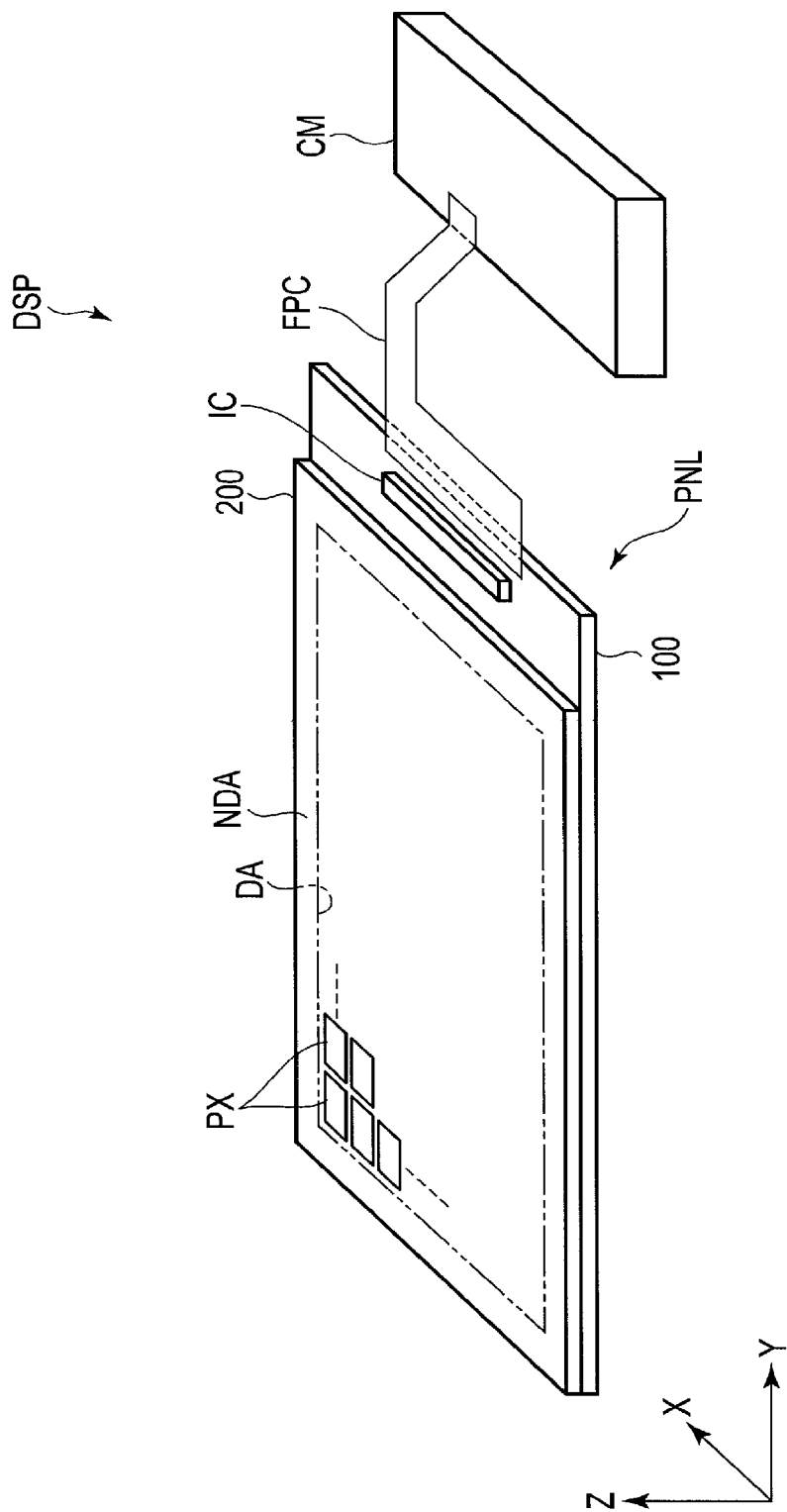
F I G. 1

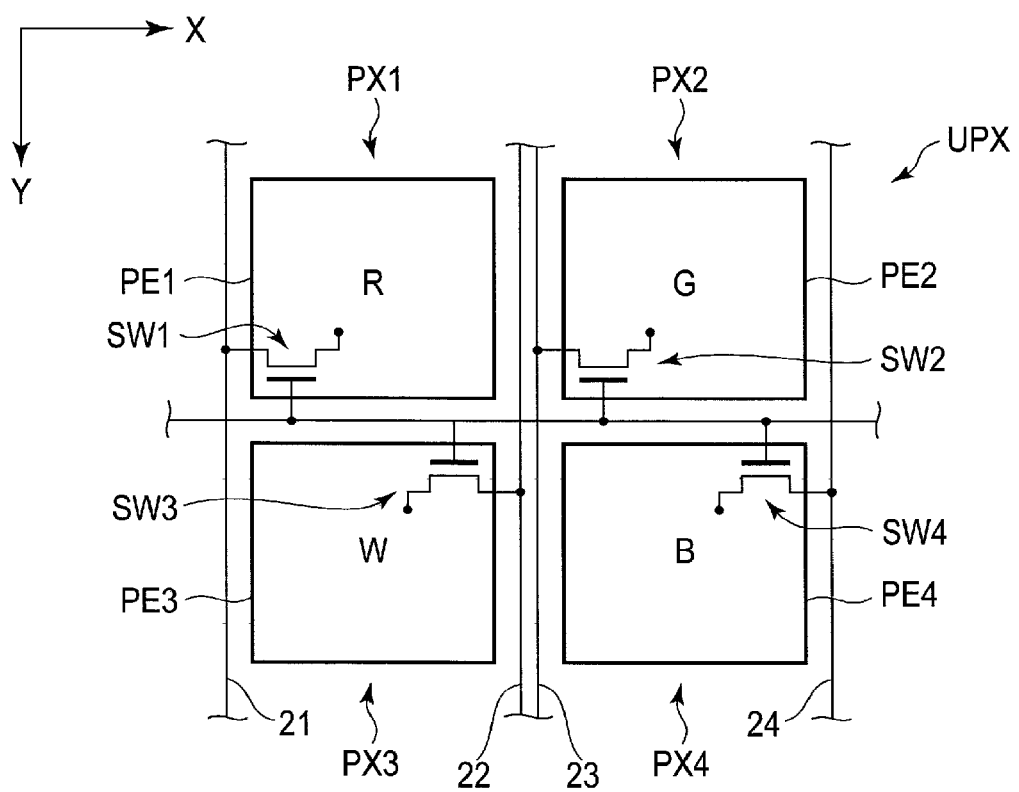
F I G. 2

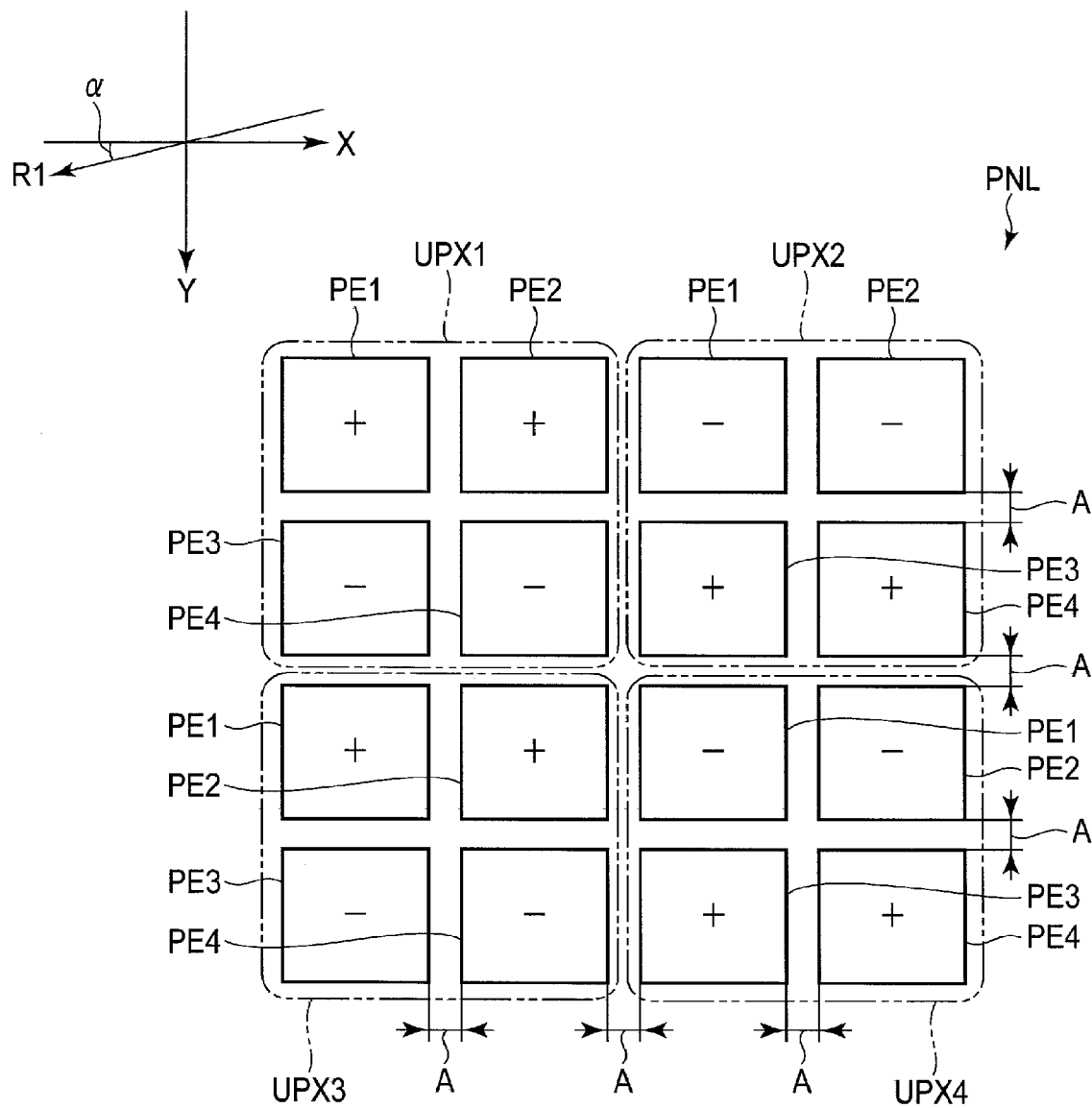
F I G. 4

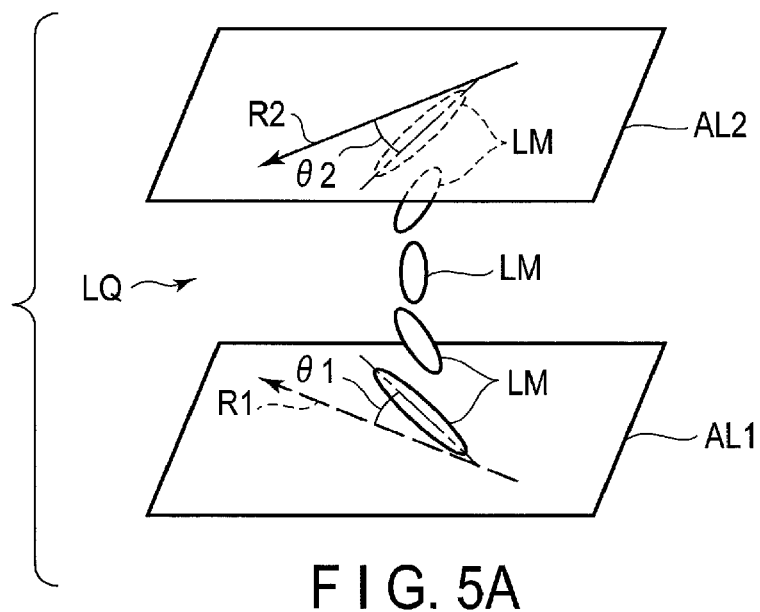
F I G. 5A
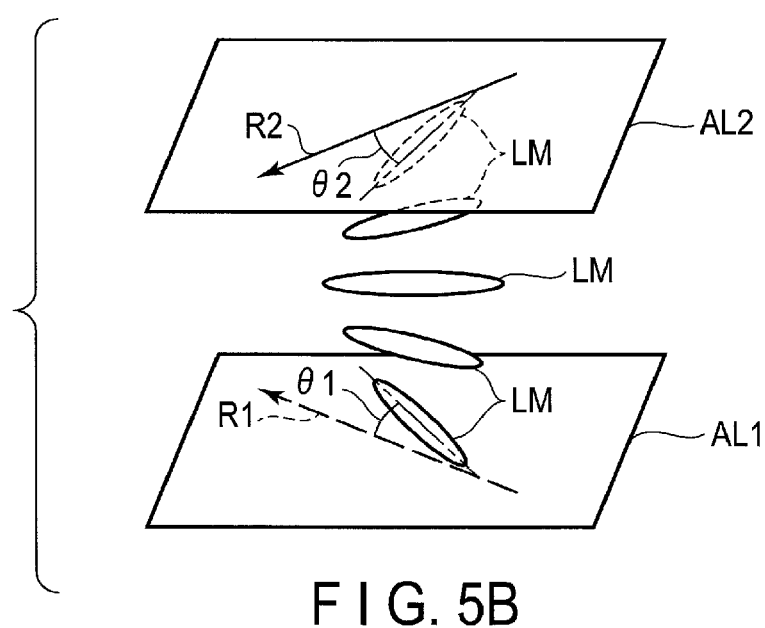
F I G. 5B

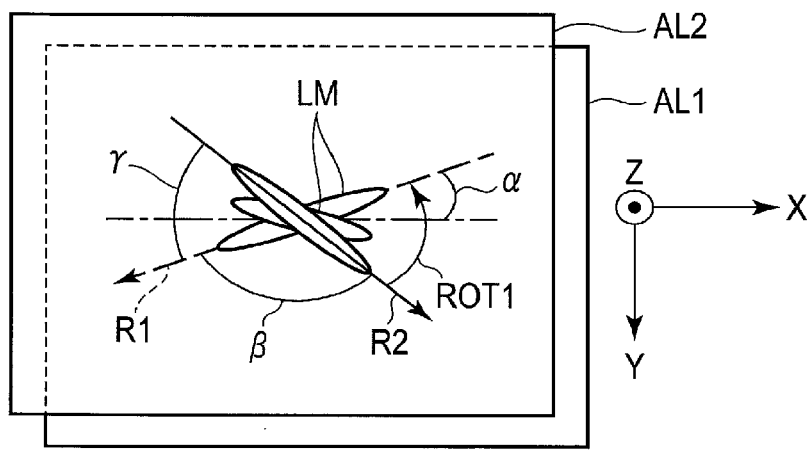
F I G. 5C
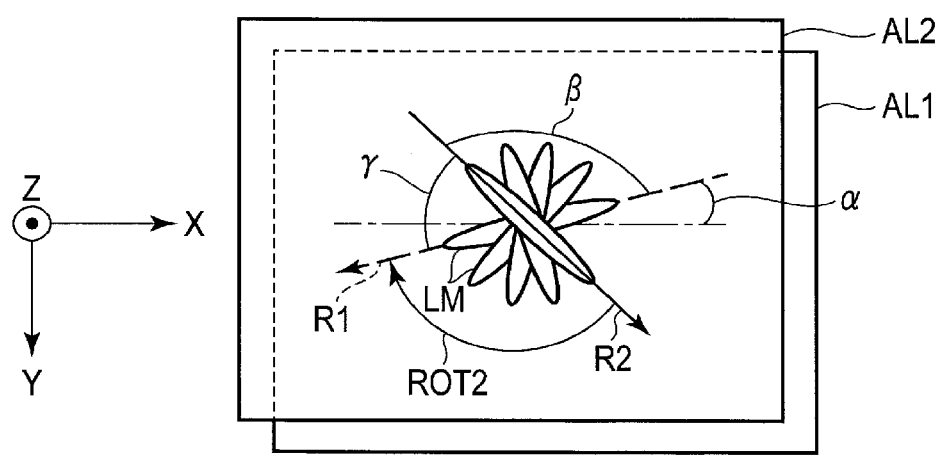
F I G. 5D

LIQUID CRYSTAL DISPLAY DEVICE

CROSS-REFERENCE TO RELATED APPLICATIONS

This application is based upon and claims the benefit of priority from Japanese Patent Application No. 2014-241854, filed Nov. 28, 2014, the entire contents of which are incorporated herein by reference.

FIELD

Embodiments described herein relate generally to a liquid crystal display device.

BACKGROUND

In general, as a liquid crystal display device, a light reflection type liquid crystal display device is known. Liquid crystal display devices are classified into liquid crystal display devices adapted for a twisted nematic (NT) mode, an in-plane switching (IPS) mode, a vertical alignment (VA) mode, etc. in accordance with the alignment direction of a liquid crystal. In recent years, liquid crystal display devices adapted for a RTN mode have been proposed. In the RTN mode, by applying a saturation voltage to a liquid crystal to drive the liquid crystal, the alignment of the liquid crystal can be changed from a first state referred to as a splay twisted state to a second state referred to as a uniform twisted state.

BRIEF DESCRIPTION OF THE DRAWINGS

FIG. 1 is a perspective view showing a liquid crystal display device according to an embodiment.

FIG. 2 is a view showing a unit pixel in a liquid crystal display panel as shown in FIG. 1.

FIG. 4 is a view showing a plurality of unit pixels in the liquid crystal display panel, and also the polarities of image signals supplied to the pixel electrodes.

FIG. 5A is a perspective view showing a first alignment film, a second alignment film and liquid crystal molecules in the liquid crystal display panel, and also the alignment of the liquid crystal molecules in the case where a direction of rotation in which the liquid crystal molecules is twisted is changed.

FIG. 5B is a perspective view showing the first alignment film, second alignment film and liquid crystal molecules in the liquid crystal display panel, and also the alignment of the liquid crystal molecules before the above direction of rotation is changed.

FIG. 5C is a plan view showing the first alignment film, second alignment film and liquid crystal molecules in the liquid crystal display panel, and also the alignment of the liquid crystal molecules in the case where the direction of rotation is changed.

FIG. 5D is a plan view showing the first alignment film, second alignment film and liquid crystal molecules in the liquid crystal display panel, and also the alignment of the liquid crystal molecules before the direction of rotation is changed.

DETAILED DESCRIPTION

Figure 3:
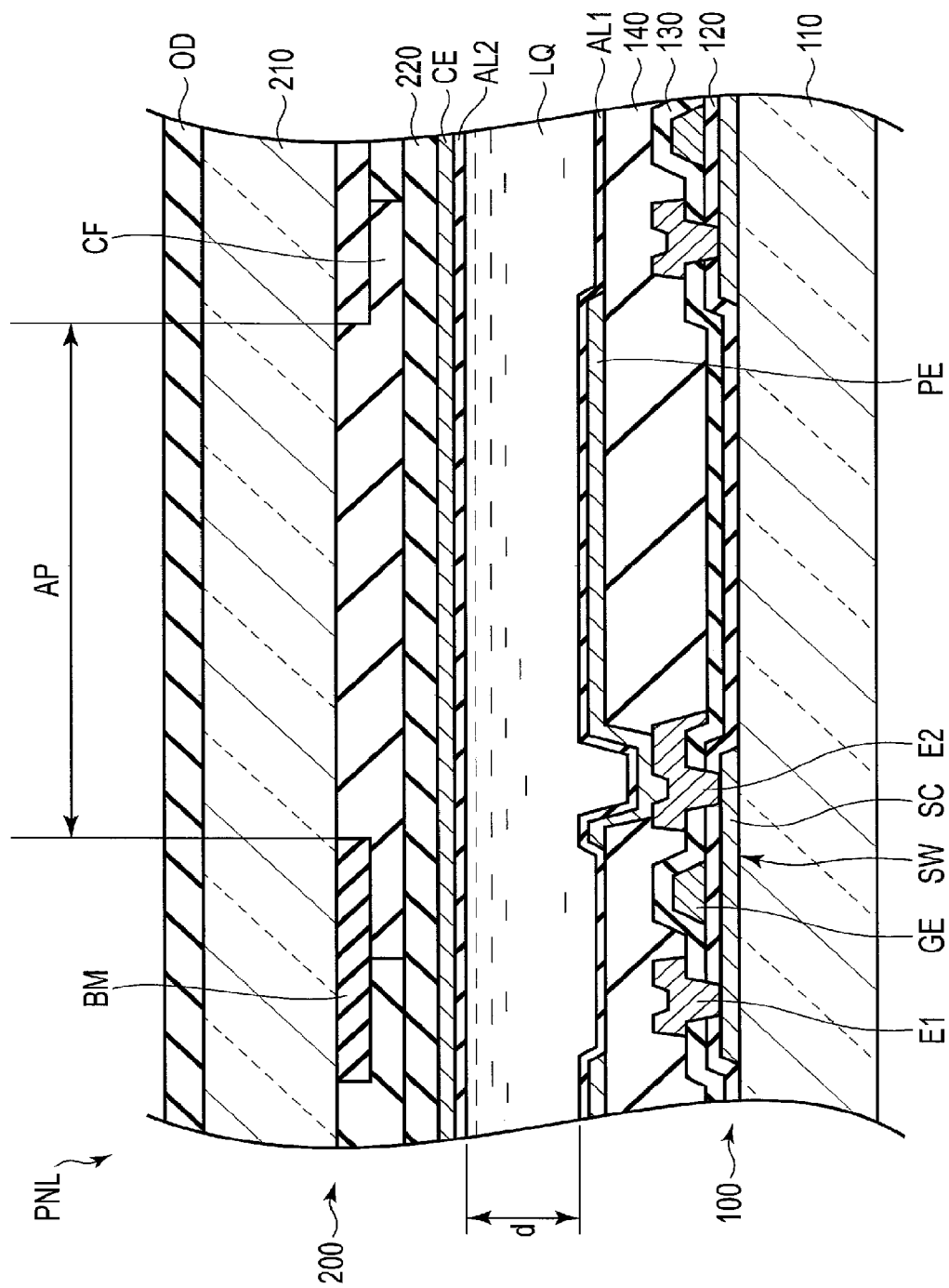
FIG. 3 is an enlarged cross-sectional view showing part of the liquid crystal display panel.

In general, according to one embodiment, there is provided a liquid crystal display device comprising: a liquid crystal layer; a first substrate including a light reflection type of first pixel electrode and a first alignment film which is in contact with the liquid crystal layer and subjected to a first alignment treatment; and a second substrate including a counter-electrode which is located opposite to the first pixel electrode and a second alignment film which is in contact with the liquid crystal layer and subjected to a second alignment treatment. The direction in which the first alignment treatment is performed is inclined in a second direction of rotation at an angle of 110° to 130° with respect to in the direction in which the second alignment treatment is performed. The liquid crystal layer is formed of a liquid crystal material containing an optically active substance which gives liquid crystal molecules a twisting force from the second alignment film toward the first alignment film in the second direction of rotation.

An embodiment will be described hereinafter with reference to the accompanying drawings. The disclosure is a mere example, and arbitrary change of gist which can be easily conceived by a person of ordinary skill in the art naturally falls within the inventive scope. To better clarify explanations, the drawings may schematically show width, thickness, shape, etc., of each portion as compared with an actual aspect, but they are mere examples and do not restrict the interpretation of the invention. In the present specification and drawings, after structural elements are each explained once with reference to the drawings, there is a case where their explanations will be omitted as appropriate, and those identical to or similar to the explained structural elements will be denoted by the same reference numbers, respectively, as the explained structural elements.

FIG. 1 is a perspective view schematically showing a liquid crystal display device according to an embodiment. Also, it indicates a first direction X, a second direction Y and a third direction Z. The second direction Y is perpendicular to the first direction X. The third direction Z is perpendicular to the first direction X and the second direction Y.

As shown in FIG. 1, a liquid crystal display device DSP is a light reflection type liquid crystal display device which displays an image by selectively reflecting natural light (external light). The liquid crystal display device DSP comprises a liquid crystal display panel PNL, a flexible circuit board FPC and a controller CM. The liquid crystal display panel PNL includes a display area DA which displays an image and a non-display area NDA which is provided to surround the display area DA. The flexible circuit board FPC is connected to the non-display area NDA of the liquid crystal display panel PNL. The controller CM is connected to the liquid crystal display panel PNL via the flexible circuit board FPC. The controller CM controls an image signal (for example, a video signal) to be output to the liquid crystal display panel PNL.

The liquid crystal display panel PNL comprises a first substrate 100, a second substrate 200 and an integrated circuit chip IC. In this embodiment, the first substrate 100 can be restated as an array substrate, and the second substrate 200 can be as a counter-substrate. For example, the short sides of the first substrate 100 and the second substrate 200 extend in the first direction X. The long sides of the first substrate 100 and the second substrate 200 extend in the second direction Y. The first substrate 100 is located to face the second substrate 200 in the third direction Z. The long side of the first substrate 100 is longer than that of the second substrate 200. Thus, the first substrate 100 includes an area not facing the second substrate 200. On this area, the integrated circuit chip IC is mounted.

The liquid crystal display panel PNL comprises a plurality of pixels PX arranged in the first direction X and the second direction Y in the display area DA. The light reflectance of each of the pixels PX is varied in accordance with an image signal (video signal) supplied from the controller CM. Thereby, the liquid crystal display panel PNL displays an image (video) in the display area DA.

FIG. 2 is a view schematically showing each of unit pixels UPX in the liquid crystal display panel PNL.

As shown in FIG. 2, a unit pixel UPX comprises a first pixel PX1, a second pixel PX2, a third pixel PX3 and a fourth pixel PX4. The first to fourth pixels PX1 to PX4 are, for example, square. The second pixel PX2 is adjacent to the first pixel in the first direction. The third pixel PX3 is adjacent to the first pixel PX1 in the second direction. The fourth pixel PX4 is adjacent to the second pixel PX2 in the second direction Y and also to the third pixel PX3 in the first direction X. The first pixel PX1 is a first-color pixel, for example, a red (R) pixel. The second pixel PX2 is a second-color pixel, for example, a green (G) pixel. The third pixel PX3 is a third-color pixel, for example, a white (W) pixel. The fourth pixel PX4 is a fourth-color pixel, for example, a blue (B) pixel. Furthermore, in view of luminosity factor, it is preferable that as in the embodiment, the second pixel PX2 and the third pixel PX3 be arranged in a diagonal line of the unit pixel UPX, and the third pixel PX3 be further separated from the second pixel PX2 than the first pixel PX1 and the fourth pixel PX4.

The first pixel PX1 comprises a first switching element SW1 and a first pixel electrode PE1 electrically connected to the first switching element SW1. The second pixel PX2 comprises a second switching element SW2 and a second pixel electrode PE2 electrically connected to the second switching element SW2. The third pixel PX3 comprises a third switching element SW3 and a third pixel electrode PE3 electrically connected to the third switching element SW3. The fourth pixel PX4 comprises a fourth switching element SW4 and a fourth pixel electrode PE4 electrically connected to the fourth switching element SW4.

The first switching element SW1 is further electrically connected to a gate line 10 and a first signal line 21. The second switching element SW2 is further electrically connected to the gate line 10 and a third signal line 23. The third switching element SW3 is further electrically connected to the gate line 10 and a second signal line 22. The fourth switching element SW4 is further electrically connected to the gate line 10 and a fourth signal line 24. The gate line 10 extends in the first direction X, and is located between the first pixel PX1 and the third pixel PX3 and between the second pixel PX2 and the fourth pixel PX4. The first signal line 21 to fourth signal line 24 extend in the second direction Y, and are arranged adjacent to each other in the first direction. The first signal line 21 is located adjacent to the second signal line 22, with the first pixel PX1 and the third pixel PX3 interposed between them. The third signal line 23 is located adjacent to the second signal line 22. The fourth signal line 24 is located adjacent to the third signal line 23, with the second pixel PX2 and the fourth pixel PX4 interposed between them. It should be noted that the signal lines need not always linearly extend; i.e., they may be partially bent or be inclined with respect to the second direction Y.

The switching elements SW each control inputting of an image signal (video signal) from an associated signal line to an associated pixel electrode PE in accordance with a voltage applied to the gate line 10. The unit pixel UPX combines the colors of the pixels PX into an arbitrary color. Since a plurality of unit pixels UPX each having the above feature are arranged in a matrix, the liquid crystal display device DSP can display a color image (video).

It should be noted that the number of pixels included in a single unit pixel UPX is not limited to a specific number. Thus, it may be set to three or less, or it may be set to five or more. Also, the colors of the pixels included in the single unit pixel UPX are not limited to specific colors. Thus, the unit pixel UPX may include pixels PX of colors other than red, green, white and blue. Furthermore, the white pixel PX3 may be made as a pixel of faint color.

FIG. 3 is an enlarged cross-sectional view of part of the liquid crystal display panel. The liquid crystal display panel PNL comprises the first substrate 100, the second substrate 200, a liquid crystal layer LQ, and an optical element OD. It should be noted that suppose a surface of the first substrate 100, which faces the second substrate, is an inner surface of the first substrate 100; and a surface of the second substrate 200, which faces the first substrate 100, is an inner surface of the second substrate 200.

The first substrate 100 comprises a first insulating substrate 110, switching elements SW (SW1, SW2, SW3 and SW4), a first insulating film 120, a second insulating film 130, a third insulating film 140, light reflection type of pixel electrodes PE (PE1, PE2, PE3 and PE4) and a first alignment film AL1. The switching elements SW each comprise a semiconductor layer SC, a gate electrode GE, a first electrode E1 and a second electrode E2.

The first insulating substrate 110 is formed of an insulating material having transparency, such as a glass substrate or a resin substrate. The semiconductor layer SC is formed on the inner surface side of the first insulating substrate 110. The semiconductor layer SC is formed of, for example, a silicon-based semiconductor such as amorphous silicon or polycrystalline silicon, an oxide semiconductor such as an indium zinc oxide, a compound semiconductor or an organic semiconductor.

The first insulating film 120 covers the first insulating substrate 110 and the semiconductor layer SC. The gate electrode GE is formed on an inner surface side of the first insulating film 120, which faces the second substrate 200, and is located opposite to the semiconductor layer SC. The gate electrode GE is formed as part of the gate line 10 or it is formed to project from the gate line 10. The second insulating film 130 covers the insulating film 120 and the gate electrode GE. The first insulating film 120 and the second insulating film 130 are formed of an inorganic insulating material such as a silicon nitride or a silicon oxide.

The first electrode E1 and the second electrode E2 are formed on an inner surface side of the second insulating film 130, which faces the second substrate 200, and is located opposite to the semiconductor layer SC. Also, the first electrode E1 and the second electrode E2 extend through a hole portion penetrating the first insulating film 120 and the second insulating film 130, and are electrically connected to the semiconductor layer SC. The first electrode E1 is electrically connected to the signal line as shown in FIG. 2 or it is formed integral with the signal line. Also, the first electrode E1 and the second electrode E2 are formed of metal material such as aluminum or titanium.

The third insulating film 140 covers the second insulating film 130, the first electrode E1 and the second electrode E2. The third insulating film 140 is formed of an insulating material which is suitable as material which allows it to be thicker, such as acrylic resin, in order to reduce the influence of the irregularities of the second insulating film 130, the first electrode E1 and the second electrode E2, and also to flatten the inner surface side of the first substrate 100.

The pixel electrode PE is formed on an associated one of areas of an inner surface side of the third insulating film 140, which are located opposite to openings AP, the inner surface side of the third insulating film 140 being also defined as a surface side thereof facing the second substrate 200. The pixel electrode PE extends through a contact hole penetrating the third insulating film 140, and is electrically connected to the second electrode E2. The first alignment film AL1 also covers the third insulating film 140 and the pixel electrodes PE. The alignment film AL1 is in contact with a liquid crystal layer LQ.

The pixel electrode PE includes a light-reflecting conductive layer. The light-reflecting conductive layer is formed of a conductive material having light reflectivity. As the conductive material having light reflectivity, metal such as aluminum (Al) can be applied. Thereby, the light-reflecting conductive layer reflects light emitted from a display surface (optical element OD) side toward the display surface side. The pixel electrode PE may further include a transparent conductive layer in addition to the light-reflecting conductive layer. For example, the transparent conductive layer is located at a top of the pixel electrode PE. The transparent conductive layer can be formed of a transparent conductive material. As the transparent conductive material, for example, indium tin oxide (ITO) or indium zinc oxide (IZO) can be applied.

The second substrate 200 comprises a second insulating substrate 210, a light-shielding layer BM, color filters CF, an overcoat layer 220 and a second alignment film AL2.

The second insulating substrate 210 is formed of an insulating material having a light-transmitting property, such as a glass substrate or a resin substrate. The light-shielding layer BM is formed on an inner surface side of the second insulating substrate 210, which faces the first substrate 100. The light-shielding layer BM is formed of a resin material which reflects or absorbs light. The openings AP are defined by the light-shielding layer BM, and are also areas of the second substrate 200 through which light is passed. The color filters CF are formed in areas of an inner surface side of the second insulating substrate 210, which are located opposite to the openings AP, the inner surface side of the second insulating substrate 210 being also defined as a surface side thereof facing the second substrate 200. Furthermore, the color filters CF also extend to areas located opposite to the light-shielding layer BM. The color filters CF are formed of colored resin material. Of the color filters CF, adjacent color filters CF are colored to have different colors. Also, the boundary between the adjacent color filters CF is located opposite to the light-shielding layer BM.

The overcoat layer 220 is formed on the color filters CF. The overcoat layer 220 reduces the influence of the irregularities of the color filters CF, and flattens the inner surface side of the second substrate 200. A counter-electrode CE is formed on the overcoat layer 220. The counter-electrode CE is formed of, for example, a transparent conductive material such as ITO. The counter-electrode CE is located opposite to pixel electrodes PE each including a first pixel electrode PE1, a second pixel electrode PE2, a third pixel electrode PE3 and a fourth pixel electrode PE4, which are explained above. The counter-electrode CE is also shared among pixels PX (PX1, PX2, PX3 and PX4), and thus functions as a common electrode. The second alignment film AL2 is formed on the counter-electrode CE. The second alignment film AL2 is in contact with the liquid crystal layer LQ. The first alignment film AL1 and the second alignment film AL2 are horizontal alignment films, and formed of a material which exhibits horizontal alignment properties. The first alignment film AL1 is subjected to a first alignment treatment, and the second alignment film AL2 is subjected to a second alignment treatment. As the first and second alignment treatments, for example, rubbing or an optical alignment treatment can be applied. In this embodiment, rubbing is performed as the first and second alignment treatments.

The liquid crystal layer LQ is held between the first substrate 100 and the second substrate 200. Also, the liquid crystal layer LQ is in contact with the first alignment film AL1 and the second alignment film AL2. In addition, the liquid crystal layer LQ has a positive dielectric anisotropy, and is formed of a nematic liquid crystal material. In the embodiment, the thickness of the liquid crystal layer LQ is set to fall within 2.5 to 2.9 μm. As described later, the liquid crystal layer LQ is formed of a liquid crystal material containing an optically active substance. The quantity $\Delta nd$, where $\Delta n$ is the refractive anisotropy of the above liquid crystal material and d is the thickness of the liquid crystal layer LQ, is referred to as retardation. In the embodiment, the retardation $\Delta nd$ is set such that $0.125 \leq \Delta nd \leq 0.232$. The optical element OD is formed of an outer surface side of the second insulating substrate 210, which is located to opposite to the above defined inner surface side. The optical element OD includes, for example, a polarizer.

FIG. 4 is a view schematically showing the unit pixels UPX and the pixel electrodes PE in the liquid crystal display panel PNL, and also the polarities of image signals supplied to the pixel electrodes PE.

As shown in FIG. 4, the liquid crystal panel PNL is driven by the controller CM in a polarity inversion manner. To be more specific, the polarity of an image signal to be supplied to each pixel electrode PE is inverted at intervals of a single frame period.

FIG. 4 shows four adjacent unit pixels, i.e., a first unit pixel UPX1, a second unit pixel UPX2, a third unit pixel UPX3 and a fourth unit pixel UPX4. The second unit pixel UPX2 is located adjacent to the first unit pixel UPX1 in the first direction X. The third unit pixel UPX3 is located adjacent to the first unit pixel UPX1 in the second direction Y. The fourth pixel UPX4 is located adjacent to the second unit pixel UPX2 in the second direction Y, and also adjacent to the third unit pixel UPX3 in the first direction X. Each of the unit pixels comprises four pixels, i.e., first to fourth pixels PX1 to PX4, and four pixel electrodes, i.e., first to fourth pixel electrodes PE1 to PE4. The pixel electrodes PE are arranged and spaced from each other by distance A in the first direction X and the second direction Y. Distance A is set to fall within the range of 3 to 5 μm.

In an arbitrary single frame period, image signals having a positive (+) polarity are supplied to the first and second pixel electrodes PE1 and PE2 of the first unit pixel UPX1, the third and fourth pixel electrodes PE3 and PE4 of the second unit pixel UPX2, the first and second pixel electrodes PE1 and PE2 of the third unit pixel UPX3 and the third and fourth pixel electrodes PE3 and PE4 of the fourth unit pixel UPX4. Also, in the above frame period, image signals having a negative (−) polarity are supplied to the third and fourth pixel electrodes PE3 and PE4 of the first unit pixel UPX1, the first and second pixel electrodes PE1 and PE2 of the second unit pixel UPX2, the third and fourth pixel electrodes PE3 and PE4 of the third unit pixel UPX3 and the first and second pixel electrodes PE1 and PE2 of the fourth unit pixel UPX4. Thereafter, the polarity of the image signal to be supplied to each pixel electrode PE is inverted at intervals of a single frame period.

As can be seen from above, in any frame period, not all adjacent pixel electrodes have the same polarity, as explained as follows. With respect to the pixel electrodes PE arranged in the second direction Y, any adjacent two pixel electrodes PE have different polarities. With respect to adjacent unit pixels UPX arranged in the first direction X, for example, each of the pixel electrodes PE of the first unit pixel UPX1 has a polarity different from that of a corresponding one of the pixel electrodes PE of the second unit pixel UPX2 adjacent to the first unit pixel UPX1. Also, each of the pixel electrodes PE of the third unit pixel UPX3 has a polarity different from that of a corresponding one of the pixel electrodes PE of the fourth pixel UPX4 adjacent to the third unit pixel UPX3. For example, the polarity of the first pixel electrode PE1 of the second unit pixel UPX2 is different from that of the second pixel electrode PE2 of the first unit pixel UPX1. This is because the second pixel electrode PE2 of the first unit pixel UPX is supplied with a second image signal the polarity of which is opposite to that of a first image signal supplied to the first pixel electrode PE1 of the second unit pixel UPX2.

It should be noted that in the liquid crystal display device DSP, there is a risk that an alignment failure referred to as edge reverse may occurs in liquid crystal molecules. The edge reverse means that the alignment restriction force of the first alignment film AL1 is influenced and reduced by an electric field applied to the liquid crystal layer LQ, and the alignment of liquid crystal molecules is put out of order. As the electric field applied to the liquid crystal layer LQ, for example, an electric field which generates between adjacent pixel electrodes PE having different polarities is present. In an area in which edge reverse occurs, a display failure such as leakage of light, non-uniformity of luminance or persistence of vision occurs, thus lowering the quality of a displayed image.

In the embodiment, the first alignment film AL1 is subjected to a first alignment treatment in a first alignment treatment direction R1. Referring to FIG. 4 provided as a plan view, the first alignment treatment direction R1 is inclined at a predetermined angle $\alpha$ with respect to an opposite direction of the first direction X, in a counterclockwise direction toward the second direction Y. The angle $\alpha$ is an angle between the first alignment treatment direction R1 and the opposite direction of the first direction X as shown in FIG. 4. Also, the angle $\alpha$ is an acute angle between the first alignment direction R1 and the first direction X, and falls within the range of 11.5° to 21.5°. In the embodiment, $\alpha$ is 21.5°.

Therefore, it can be seen, from the first alignment treatment direction R1, the polarity of each of the pixel electrodes PE, and the distance A (3 to 5 μm) between adjacent pixel electrodes PE, that edge reverse easily occurs at side edge portions of the second and fourth pixel electrodes PE2 and PE4 of the first unit pixel UPX1, which are located opposite to the second unit pixel UPX2, and also at edge portions of the second and fourth pixel electrodes PE2 and PE4 of the third unit pixel UPX3, which are located opposite to the fourth unit pixel UPX4.

Then, the means and method for restricting the occurrence of the edge reverse will be explained with reference to FIGS. 5A to 5D. By applying the means and the method, it is possible to obtain a liquid crystal display device DSP having a high display quality.

FIGS. 5A to 5D each show liquid crystal molecules LM, the first alignment film AL1 and the second alignment film AL2 in the liquid crystal display panel PNL. FIG. 5A is a perspective view showing the alignment of liquid crystal molecules LM in the case where the direction of rotation in which the liquid crystal molecules LM are twisted is changed. FIG. 5B is a perspective view showing the alignment of the liquid crystal molecules LM before the above direction of rotation is changed. FIG. 5C is a plan view showing the alignment of liquid crystal molecules LM in the case where the direction of rotation is changed, the alignment being shown as seen from above, i.e., from the opposite direction of the third direction Z. FIG. 5D is a plan view showing the alignment of the liquid crystal molecules LM before the direction of rotation is changed, the alignment being shown as seen from above, i.e., from the opposite direction of the third direction Z.

As shown in FIGS. 5A to 5D, the first alignment treatment direction R1 is inclined at angle $\beta$ with respect to the second alignment treatment direction R2 in a second direction of rotation ROT2. The first alignment treatment direction R1 is a direction in which the first alignment treatment is performed on the first alignment film AL1. The second alignment treatment direction R2 is a direction in which the second alignment treatment is performed on the second alignment film AL2. The angle $\beta$ falls within the range of 110° to 130°. Liquid crystal molecules LM are initially aligned in the vicinity of a surface of the first alignment film AL1, while being tilted at pretilt angle $\theta 1$ with respect to the first alignment treatment direction R1. Also, liquid crystal molecules LM are initially aligned in the vicinity of a surface of the second alignment film AL2, while being tilted toward the first alignment film AL1 at pretilt angle $\theta 2$ with respect to the first alignment treatment direction R2.

Thus, if attention is paid to the first and second alignment treatment directions R1 and R2 only, a reverse twist occurs in the liquid crystal layer LQ, and thus the alignment of the liquid crystal molecules LM is not stable. That is, in the liquid crystal layer LQ, a first twisted structure and a second twisted structure are both present as twisted structures of liquid crystal molecules LM.

The first twisted structure is shown in FIGS. 5A and 5C, and in this twisted structure, liquid crystal molecules LM are twisted at angle $\gamma$ in a first direction of rotation ROT1 from the second alignment film AL2 toward the first alignment film AL1. The alignment direction of the liquid crystal molecules LM continuously changes. The first direction of rotation ROT1 is opposite to the second direction of rotation ROT2. It should be noted that angle $\gamma$ satisfies the formula "$\gamma=180°-\beta$". In the embodiment, angle $\gamma$ satisfies the formula "$50°\leq\gamma\leq70°$". In the first twisted structure, director of an intermediate layer of the liquid crystal layer LQ is aligned substantially perpendicular to the surfaces of the first alignment film AL1 and the second alignment film AL2. The intermediate layer corresponds to a central region of the liquid crystal layer LQ in the third direction Z. There is a case where the first twisted structure is referred to as a uniform twisted structure.

In contrast, the second twisted structure is shown in FIGS. 5B and 5D, and in this twisted structure, liquid crystal molecules LM are twisted at angle $\beta$ in the second direction of rotation ROT2 from the second alignment film AL2 toward the first alignment film AL1. The alignment direction of the liquid crystal molecules LM continuously changes. In the second twisted structure, directors of the intermediate layer of the liquid crystal layer LQ are aligned in substantially parallel with the surfaces of the first alignment film AL1 and the second alignment film AL2. There is a case where the second twisted structure is referred to as a splay twisted structure.

In the embodiment, the liquid crystal layer LQ is formed of a liquid crystal material containing an optically active substance which gives liquid crystal molecules LM a twisting force from the second alignment film AL2 toward the first alignment film AL1 in the second direction of rotation ROT2. That is, the optically active substance gives a twisting force in a direction of rotation (second direction of rotation ROT2) opposite to the direction of rotation (first direction of rotation ROT1) in which liquid crystal molecules LM twist, when the above first twisted structure (uniform twisted structure) is achieved while applying the first and second alignment treatment directions R1 and R2 in combination. It should be noted that the optically active substance is referred to as a chiral agent.

By virtue of the above means and method, the liquid crystal layer LQ can have the second twisted structure without being subjected to an electric-field treatment or the like, and the alignment of the liquid crystal molecules LM is stabilized. Furthermore, it is possible to prevent the occurrence of reverse twist in the liquid crystal layer LQ. It should be noted that in the embodiment, $0.125 \leq d/p \leq 0.3$, where p is the helical pitch of a liquid crystal material in the case where the liquid crystal layer LQ has the second twisted structure, and d is the thickness of the liquid crystal layer LQ; that is: d/p is the ratio of the thickness of the liquid crystal layer to the above helical pitch.

In the case where an image is displayed by the liquid crystal display device DSP, it suffices that after the twisted structure of the liquid crystal molecules LM is changed from the second twisted structure (splay twisted structure) to the first twisted structure (uniform twisted structure) (this is an initial transition), signal lines are ordinarily driven, and an image signal (video signal) having a desired voltage level is supplied to the pixel electrodes PE. It should be noted that there is a case where the display mode of the liquid crystal display device DSP according to the embodiment is referred to as a reverse twisted nematic (RTN) mode.

The initial transition (the transition from the second twisted structure to the first twisted structure), i.e., the change of the direction of rotation in which liquid crystal molecules LM are twisted, is made by applying a transition voltage to the liquid crystal layer LQ with the pixel electrodes PE and the counter-electrode CE. That is, the transition voltage is applied between the pixel electrodes PE and the counter-electrode CE. It should be noted that a voltage signal to be applied to obtain the transition voltage is not especially limited. For example, the level of the transition voltage corresponds to that of a voltage to be applied to the liquid crystal layer LQ for halftone display. In addition, as an example of the above voltage signal, a low AC signal such as a sine wave having a frequency of approximately 1 Hz is applied, whereby it is possible to effect the transition from the second twisted structure to the first twisted structure for a short time period.

According to the embodiment, the liquid crystal display device DSP having the above structure is provided as a liquid crystal display device adopting the RTN mode, and the twisted structure of liquid crystal molecules LM is changed from the second twisted structure (splay twisted structure) to the first structure (uniform twisted structure) by applying a transition voltage to the liquid crystal layer LQ. The inventors of the present application discovered that the above RTN mode is applied to the light reflection type liquid crystal display device DSP, thereby effectively restricting the occurrence of edge reverse. It is assumed that this advantage can be obtained by a structural feature in which the tilt angle of liquid crystal molecules LM of the intermediate layer in the first twisted structure is greater than that of liquid crystal molecules LM of an intermediate layer in the second twisted structure, as a result of which for example, the alignment direction of the liquid crystal molecules LM of the intermediate layer is not easily reversed by an electric field. Therefore, according to the embodiment, it is possible to obtain a liquid crystal display device having a high display quality.

Furthermore, in the embodiment, since the occurrence of edge reverse can be restricted, the above light-shielding layer BM does not need to be made thick. It is therefore possible to prevent the amount of natural light (external light) to be taken from being lowered by the light-shielding layer BM. Accordingly, the obtained liquid crystal display device can restrict lowering of the luminance level of a displayed image. It should be noted that if the occurrence of edge reverse cannot be restricted, the light-shielding layer BM needs to be made thick to cover the occurrence of edge reverse.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the first direction of rotation ROT1 and the second direction of rotation ROT2 may be opposite to those of the embodiment as described above.

For example, as seen in plan view, for example, in FIGS. 5C and 5D, the second alignment treatment direction R2 may be twisted and inclined at angle β in a clockwise direction with respect to the first alignment treatment direction R1.

The shape of each of the pixel electrodes PE is not limited to a square, but can be variously modified and may be a rectangle. Each pixel electrode PE may be formed in a shape other than a rectangle. In such cases, it is possible to obtain the same advantages as the above-described embodiment.

Each of the unit pixels UPX is not limited to a unit pixel made up of RGBW square pixels (i.e., four RGBW square pixels squarely-arranged), but can be variously modified and may be made up of, for example, so-called RGBW lateral stripe pixels (four RGBW rectangular pixels [pixel electrodes] arranged in a stripe manner).

Alternatively, each unit pixel UPX may be made up of so-called RGB lateral stripe pixels (i.e., three rectangular RGB [general primary colors] pixels (pixel electrodes) arranged in a stripe manner). Furthermore, each unit pixel UPX may be made up of four or more color pixels including a yellow (Y) pixel or including both a W pixel and a Y pixel.

The polarity-inversion drive scheme of the liquid crystal panel PNL is not limited to that described with respect to the embodiment, but can be variously modified. In the case where in an arbitrary single frame period, driving is performed such that adjacent pixel electrodes PE have different polarities, the same advantages as described above with respect to the embodiment can be obtained.

The above embodiment is not limited to the above liquid crystal display device, but can be applied to various liquid crystal display devices.

What is claimed is:

1. A liquid crystal display device comprising:
a liquid crystal layer;
a first substrate including a light reflection type of first pixel electrode and a first alignment film which is in contact with the liquid crystal layer and subjected to a first alignment treatment; and
a second substrate including a counter-electrode which is located opposite to the first pixel electrode and a second alignment film which is in contact with the liquid crystal layer and subjected to a second alignment treatment,
wherein
a direction in which the first alignment treatment is performed is inclined in a second direction of rotation at an angle of 110° to 130° with respect to in a direction in which the second alignment treatment is performed, and
the liquid crystal layer is formed of a liquid crystal material containing an optically active substance which gives liquid crystal molecules a twisting force from the second alignment film toward the first alignment film in the second direction of rotation,
in a first twisted structure, the liquid crystal molecules are twisted from the second alignment film toward the first alignment film in a first direction of rotation which is opposite to the second direction of rotation, a director in an intermediate layer included in the liquid crystal layer is aligned substantially perpendicular to a surface of the first alignment film and a surface of the second alignment film,
in a second twisted structure, the director in the intermediate layer included in the liquid crystal layer is aligned substantially parallel to the surface of the first alignment film and the surface of the second alignment film,
a direction of rotation in which the liquid crystal molecules are twisted is changed to the first twisted structure from the second twisted structure when a transition voltage is applied to the liquid crystal layer by the first pixel electrode and the counter-electrode,
ordinary driving is performed after the direction of rotation is changed to the first twisted structure from the second twisted structure, and
a tilt angle of liquid crystal molecules of the intermediate layer in the first twisted structure is greater than a tilt angle of liquid crystal molecules of the intermediate layer in the second twisted structure.

2. The liquid crystal display device of claim 1, wherein $0.125 \leq d/p \leq 0.3$
where p is a helical pitch of the liquid crystal material, and d is a thickness of the liquid crystal layer.

3. The liquid crystal display device of claim 1, wherein the liquid crystal layer has a thickness which falls within a range of 2.5 to 2.9 μm.

4. The liquid crystal display device of claim 1, wherein $0.125 \leq \Delta nd \leq 0.232$
where $\Delta n$ is a refractive anisotropy of the liquid crystal material and d is a thickness of the liquid crystal layer.

5. The liquid crystal display device of claim 1, wherein the first substrate further includes a light reflection type of second pixel electrode which is located apart from the first pixel electrode and opposite to the counter-electrode, and is given a second image signal having a polarity opposite to that of a first image signal to be supplied to the first pixel electrode.

6. The liquid crystal display device of claim 5, wherein a distance between the first pixel electrode and the second pixel electrode falls within a range of 3 to 5 μm.

7. The liquid crystal display device of claim 1, wherein the first substrate further includes unit pixel which comprises: a first pixel which includes the first pixel electrode and is provided as a first-color pixel; a second pixel which is located adjacent to the first pixel in a first direction, includes a light reflection type of second pixel electrode, and is provided as a second-color pixel; a third pixel which is located adjacent to the first pixel in a second direction intersecting the first direction, includes a light reflection type of third pixel electrode, and is provided as a third-color pixel; and a fourth pixel which is located adjacent to the second pixel in the second direction and adjacent to the third pixel in the first direction, includes a light reflection type of fourth pixel electrode, and is provided as a fourth-color pixel, and
the counter-electrode is located further opposite to the second pixel electrode, the third pixel electrode and the fourth pixel electrode.

8. The liquid crystal display device of claim 7, wherein an acute angle between the direction in which the first alignment treatment is performed and the first direction falls within a range of 11.5° to 21.5°.

9. The liquid crystal display device of claim 1, wherein the liquid crystal material has a positive dielectric anisotropy, and is formed of a nematic liquid crystal material.

* * * * *